US009290406B2

(12) United States Patent
Chen et al.

(10) Patent No.: US 9,290,406 B2
(45) Date of Patent: Mar. 22, 2016

(54) METHOD FOR PRODUCING OPTICAL FIBER HAVING CONTROLLED PERTURBATIONS

(75) Inventors: Xin Chen, Corning, NY (US); Charles Frederick Laing, Wilmington, NC (US); Ming-Jun Li, Horseheads, NY (US); Anping Liu, Horseheads, NY (US); Eric John Mozdy, Horseheads, NY (US); Joseph Doull Thaler, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/587,091

(22) Filed: Aug. 16, 2012

(65) Prior Publication Data

US 2013/0047676 A1 Feb. 28, 2013

Related U.S. Application Data

(60) Provisional application No. 61/526,007, filed on Aug. 22, 2011.

(51) Int. Cl.
*C03B 37/025* (2006.01)
*C03B 37/027* (2006.01)

(52) U.S. Cl.
CPC ..... *C03B 37/02745* (2013.01); *C03B 37/02763* (2013.01); *C03B 2203/06* (2013.01); *C03B 2203/18* (2013.01); *C03B 2203/20* (2013.01); *Y02P 40/57* (2015.11)

(58) Field of Classification Search
None
See application file for complete search history.

(56) References Cited

U.S. PATENT DOCUMENTS

| 3,912,478 | A | 10/1975 | Presby |
| 4,038,062 | A | 7/1977 | Presby |
| 5,992,181 | A * | 11/1999 | Geertman ........................ 65/392 |
| 6,539,154 | B1 * | 3/2003 | Berkey et al. .................. 385/123 |
| 6,542,679 | B2 | 4/2003 | DiGiovanni et al. |
| 6,735,985 | B2 | 5/2004 | DiGiovanni et al. |
| 7,043,128 | B2 | 5/2006 | DiGiovanni et al. |
| 7,245,806 | B2 * | 7/2007 | Breuls et al. .................. 385/123 |
| 2003/0101774 | A1 * | 6/2003 | Oh et al. ......................... 65/488 |
| 2004/0168476 | A1 | 9/2004 | Chen et al. |

(Continued)

FOREIGN PATENT DOCUMENTS

| CN | 100389083 C | 5/2008 |
| GB | 2213142 A * | 8/1989 |

(Continued)

OTHER PUBLICATIONS

JP2001287927A Machine Translation performed by JPO website Dec. 1, 2015.*

*Primary Examiner* — Lisa Herring
(74) *Attorney, Agent, or Firm* — Robert L. Carlson

(57) ABSTRACT

A method for producing an optical fiber is provided. The method includes the steps of drawing an optical fiber from a heated glass source in a furnace and introducing index perturbations to the optical fiber via a plurality of perturbation sources arranged at a plurality of different azimuthal locations. The index perturbations are introduced synchronously at different locations along the axial length of the fiber by the plurality of perturbation sources in a generally helical pattern on the outside surface of the fiber in one embodiment. According to another embodiment, the index perturbations are introduced by the plurality of perturbation sources at different frequencies.

9 Claims, 3 Drawing Sheets

(56) References Cited

U.S. PATENT DOCUMENTS

2005/0238306 A1* 10/2005 Elisabeth Breuls et al. .. 385/123
2006/0093294 A1   5/2006 Manyam et al.
2008/0158905 A1*  7/2008 Chuang et al. ................ 362/581
2011/0085768 A1*  4/2011 Nakanishi et al. ............ 385/102

FOREIGN PATENT DOCUMENTS

| JP | 2001287927 A | * 10/2001 |
| TW | 200827795 |    7/2008 |
| WO | 9707067   |    2/1997 |
| WO | 2006058551 |   6/2006 |

* cited by examiner

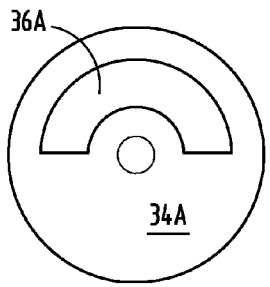
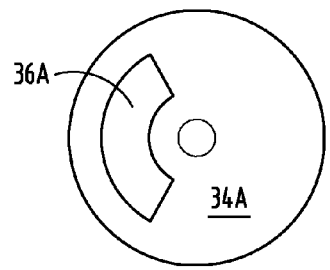
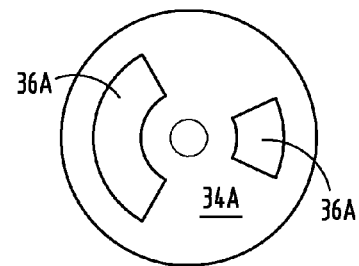
FIGURE 3A            FIGURE 3B            FIGURE 3C
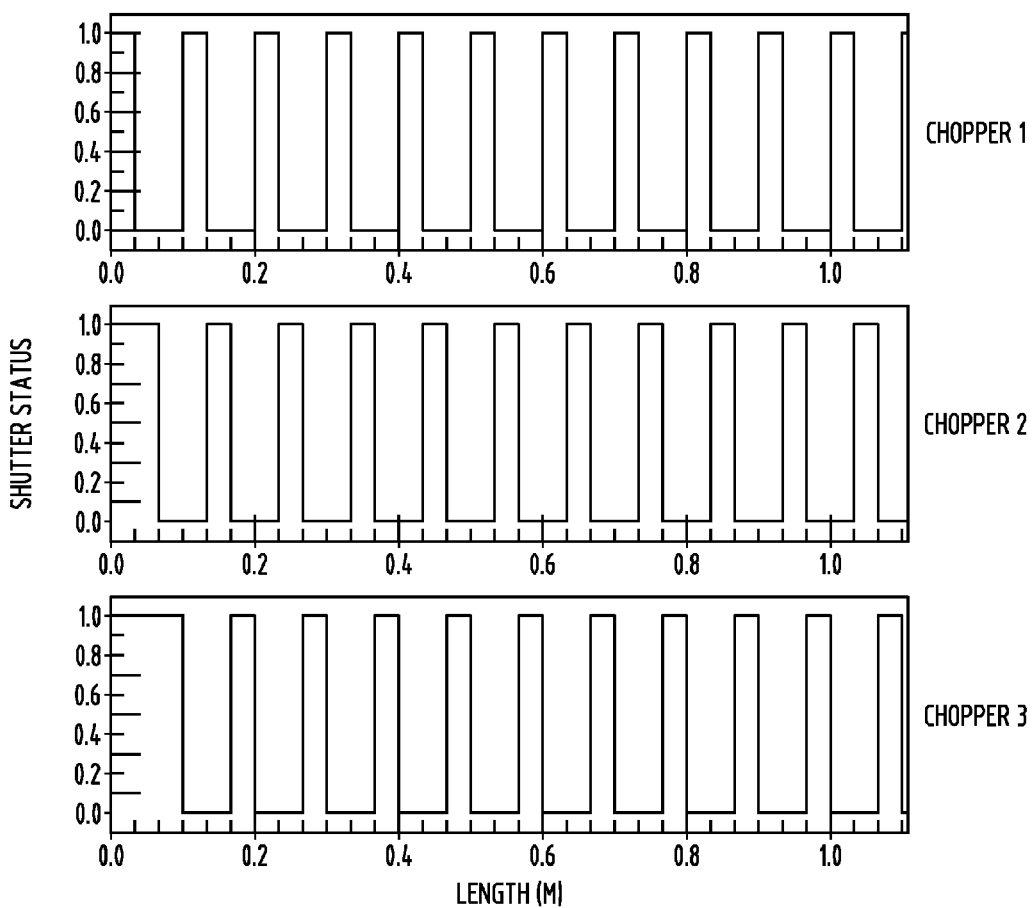
FIGURE 4

METHOD FOR PRODUCING OPTICAL FIBER HAVING CONTROLLED PERTURBATIONS

CROSS-REFERENCE TO RELATED APPLICATIONS

This application claims the benefit of priority under 35 U.S.C. §119 of U.S. Provisional Application Ser. No. 61/526,007 filed on Aug. 22, 2011, the content of which is relied upon and incorporated herein by reference in its entirety.

BACKGROUND

The present invention generally relates to a method for forming optical fiber and, more particularly relates to a method of introducing perturbations into the optical fiber during the fiber draw process.

Conventional manufacturing processes for producing optical fibers typically include drawing an optical fiber from an optical fiber preform in a draw furnace, cooling the drawn fiber, and coating the fiber after it has substantially cooled. Significant efforts have been made to improve the bandwidth of multimode fibers to increase the yield of the fiber production. Some efforts have attempted to enforce the index profile accuracy. One approach to improve the bandwidth is to introduce mode coupling in multimode fibers. Some attempts have proposed spinning or twisting the fiber to improve the multimode bandwidth to cause short range refractive index variations or perturbations that cause mode mixing. However, fiber spinning can have complex effects on both the glass and the coating and may damage the coating which may introduce attenuation.

It is therefore desirable to provide for a method of producing an optical fiber to introduce perturbations into the fiber without the drawbacks of prior approaches.

SUMMARY

According to one embodiment, a method for producing an optical fiber is provided. The method includes the step of drawing an optical fiber from a heated glass source in a furnace. The method further includes the step of introducing index perturbations to the optical fiber via a plurality of perturbation sources arranged at different azimuthal locations, wherein the index perturbations are introduced by the plurality of perturbation sources at different frequencies to cause stress in the optical fiber.

According to another embodiment, a method for producing an optical fiber is provided. The method includes the step of drawing an optical fiber from a heated glass source in a furnace. The method further includes the step of introducing index perturbations to the optical fiber via a plurality of perturbation sources arranged at a plurality of different azimuthal locations and at different locations along the axial length of the fiber, wherein the index perturbations are introduced synchronously by the plurality of perturbation sources in a generally helical pattern on the outside surface of the fiber to cause stress in the optical fiber.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIGS. 3A-3C are schematic views of gas choppers or shutters having open windows, according to various embodiments;

FIG. 4 is a timing diagram illustrating the chopper open/close status as a function of fiber position for a synchronized chopper control scheme;

DETAILED DESCRIPTION

Figures 1, 2:
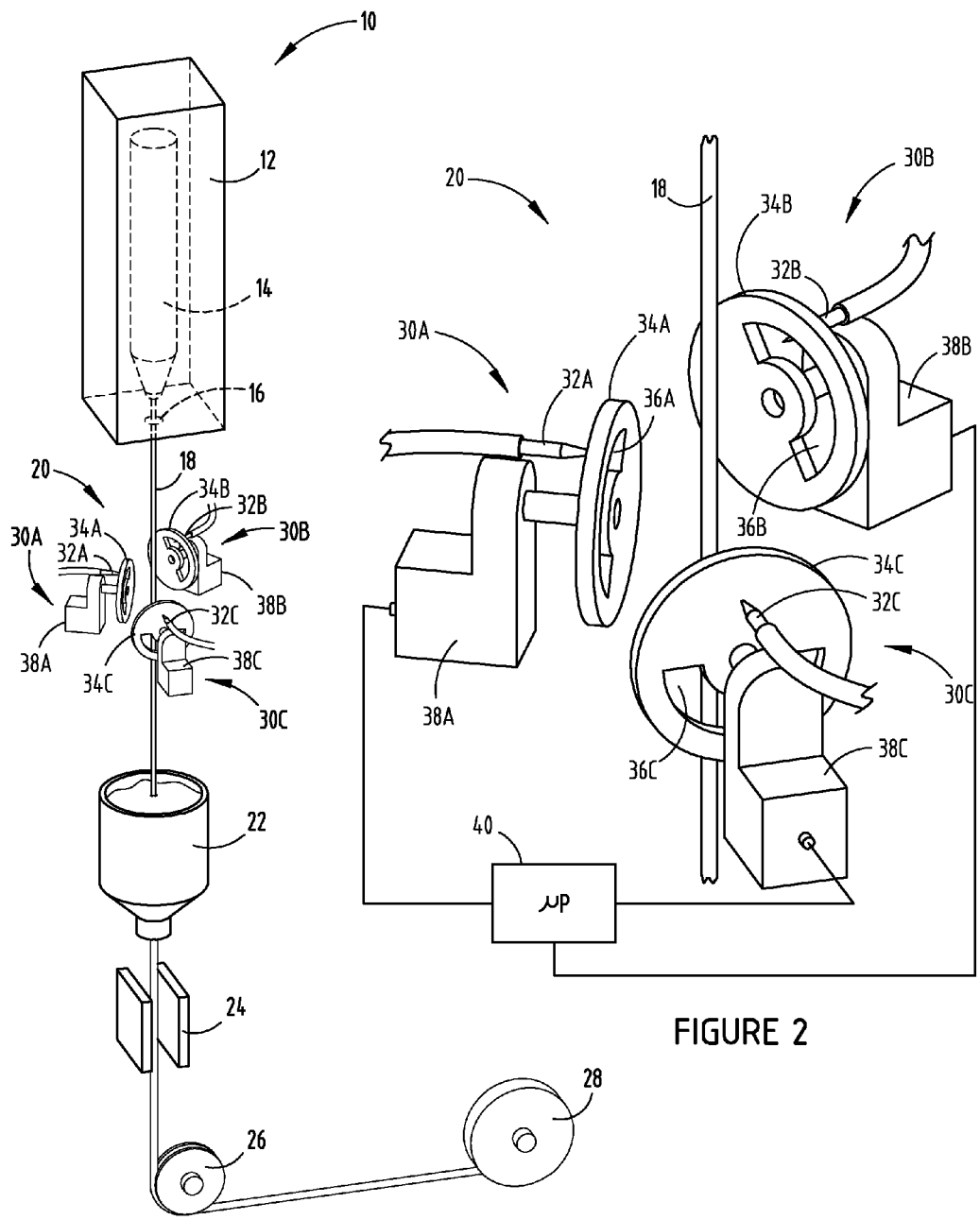
FIG. 1 is a schematic diagram illustrating an optical fiber production system including an index perturbation assembly, according to a first embodiment.
FIG. 2 is an enlarged view of the fiber and the index perturbation assembly shown in FIG. 1.

Reference will now be made in detail to the present preferred embodiments, examples of which are illustrated in the accompanying drawings. Whenever possible, the same reference numerals will be used throughout the drawings to refer to the same or like parts.

The optical fiber production system and method produces optical fibers through the use of a draw process and introduces perturbations to the optical fiber to introduce mode coupling in the glass level and improve the bandwidth of multimode fibers (MMF). Embodiments of the optical fiber production system and method are herein described in connection with the drawing FIGS. 1-6C, wherein like numbers indicate the same or corresponding elements throughout the drawings. The phrase "bare optical fiber" as used herein means an optical fiber directly drawn from a preform and prior to applying a protective coating layer to its outer surface (e.g., prior to the bare optical fiber being coated with a polymeric based material). The phrase "index perturbation" as used herein means a local change of refractive index in the fiber. The optical fiber production system and method allows for the formation of optical fiber to include the introduction of index perturbations, particularly for multimode fiber, and to distribute such perturbations in various orientations along the fiber length as disclosed herein.

Referring to FIG. 1, an optical fiber production system 10 is generally shown for producing an optical fiber pursuant to a fiber production method, according to one embodiment. The system 10 includes a furnace 12 that may be heated to a temperature of about 2,000° C., according to one example. A heated glass source, commonly referred to as an optical fiber preform 14, is placed in the furnace 12 and fiber is drawn therefrom to create a bare optical fiber 18. The preform 14 may be constructed of any glass or material and may be doped suitable for the manufacture of optical fibers. Once the bare optical fiber 18 is drawn from the preform 14, the bare optical fiber 18 may be cooled to a desired temperature using known techniques, such as a slow-cooling treatment device (not shown) or other technique such that the fiber 18 exiting the outlet 16 of furnace 12 is within a desired temperature range. The optical fiber 18 exiting the exit orifice 16 of furnace 12 is drawn at a draw speed, has a fiber diameter and a fiber temperature such that the fiber 18 is in a molten state that may be partially solidified and further solidifies as it cools. It should be appreciated that one or more centering devices may be employed to center the bare optical fiber 18 as it exits the exit orifice 16.

In the embodiment shown in FIG. 1, an index perturbation assembly 20 is located downstream of the exit orifice 16 and arranged to introduce index perturbations to the optical fiber 18. In the embodiment shown in FIG. 1, the index perturbation assembly 20 includes a plurality of perturbation sources arranged at different azimuthal locations at different angles for introducing controlled index perturbations onto the outer surface of the bare optical fiber 18. In this embodiment, the perturbation sources include a plurality of controlled gas blowing devices 30A-30C, each configured to blow gas onto the outer surface of the optical fiber 18 to cool the optical fiber 18 locally and thereby cause index perturbations in the outer surface. The gas is blown onto the fiber 18 at a location where the fiber 18 has a temperature roughly around or between the glass transition temperature (close to the root or close to where the fiber exits the furnace) and the fictive temperature. By blowing cool gas, such as air, onto the hot molten fiber 18 as it exits the furnace 12, intrinsic index profile asymmetry or fiber birefringence is caused due to stress in the fiber 18. The index perturbations are distributed over various fiber orientations along the axial length of the optical fiber 18. The controlled introduction of the index perturbations enhances the bandwidth of multimode fiber while advantageously eliminating or reducing the need for fiber spinning or twisting. In order to distribute the index perturbations in different orientations, index perturbations are introduced from several different azimuthal locations, and each perturbation device 30A-30C may be located at different locations along the axial length (i.e., different axial lengths) of the optical fiber 18. The method disclosed herein allows the index perturbations to be introduced at a desired high frequency and orientation so that the mode coupling is more effective and bandwidth improvement occurs at a shorter length regime. Using this index perturbation introduction method, fiber spinning may be eliminated, or some reduced fiber spinning can be used in conjunction with the method, according to various embodiments.

Following the step of introducing the index perturbations, the bare optical fiber 18 is then subjected to a coating unit 22 where a primary protective coating layer is applied to the outer surface of the bare optical fiber 18. The coated fiber then passes through a curing unit 24 having ultraviolet lamps to cure the coating. After leaving the curing unit 24, the optical fiber 18 with the protective layer can pass through a variety of processing stages within the production system 10 such as one or more rollers 26 and tractor 28. The tractor 28 may be used to provide the necessary tension on the optical fiber 18 as it is drawn through the entire fiber production system and eventually wound onto a storage spool. It should be appreciated that the tractor 28 may be controlled so as to control the draw speed of the fiber 18.

Referring to FIG. 2, the index perturbation assembly 20 shown in FIG. 1 is further illustrated, according to the first embodiment. In this embodiment, the assembly 20 includes three index perturbation sources shown as gas blowing devices 30A-30C arranged equiangularly at 120° azimiuthal spacings from one another around the outer surface of the optical fiber 18. In the embodiment shown, the gas blowing devices 30A-30C are each located at a different locations along the axial length of the optical fiber 18 relative to each other for blowing gas, in a controlled fashion, onto the outer surface of the optical fiber 18 at a desired angle of incidence. Each gas blowing device 30A and 30B includes gas blowing needles 32A-32C oriented to direct forced gas onto the outer surface of optical fiber 18. The gas blowing needles 32A-32C continuously output a stream of forced cooling gas supplied from a gas source, according to one embodiment. The gas may include any suitable cooling gas including nitrogen, helium, oxygen or air containing a mixture of gases. Each perturbation device 30-30C also includes an optical chopper or shutter 34A-34C shown as a disc having an open window pattern defined by one or more openings 36A-36C. Each optical chopper or shutter 34A-34C has one or more window openings that allow gas to pass through to reach the fiber 18 and solid areas that block the passage of gas to the fiber 18. Each of choppers 34A-34C is aligned with the corresponding gas blowing needles 32A-32C to control the introduction of forced gas from the needles 32A-32C onto the outer surface of optical fiber 18. The optical choppers or shutters 34A-34C are rotated via corresponding motors 38A-38C, each of which is controlled by motor control circuitry, shown as a microprocessor 40. Thus, the choppers or shutters 34A-34C operate to chop or shutter the forced gas stream output from the corresponding needles 32A-32C.

The choppers 34A-34C each have a desired shape open window and the motors 38A-38C are controlled to rotate the choppers 34A-34C to achieve a desired gas injection onto the outer surface of optical fiber 18. Each of the choppers 34A-34C is rotated by the corresponding motor 38A-38C at an angular frequency ω (radians/second) or frequency F (hertz) and is implemented such that gas blows onto the fiber for a controlled period of time during one full rotation. According to one embodiment, the index perturbations are introduced asynchronously at different locations along the axial length of the fiber by the plurality of plurality of perturbation sources 30A-30C in a generally helical pattern on the outside surface of the fiber 18. In doing so, the motors 38A-38C operate with a controlled phase and at a synchronized frequency. For a given air blowing needle 32A-32C, the air blowing behavior can be described by the following function: $\Theta_i(z-z_i, \phi_i, \omega_i, v)$, where $z_i$ is the initial position of the i-th perturbation device, $\phi_i$ is the initial phase of the chopper window, v is the draw speed, and $\omega_i$ is the angular frequency of the chopper rotation. The choppers 34A-34C and air blowing devices 32A-32C can be installed and controlled so that the open windows 36A-36C of the respective choppers 34A-34C open for forced gas to blow through are synchronous to each other.

According to one example, with three perturbation devices 30A-30C, the first perturbation device 30A may be positioned relative to the fiber at an axial position of 0 meters, the second perturbation device 30B may be positioned at an axial position of 0.1 meters, and the third perturbation device 30C may be positioned at an axial position of 0.2 meters. The fiber draw speed may be set at 10 meters per second in this example. The optical choppers 34A-34C may be rotated at the same frequency, such as 100 Hz. The phase for each chopper is set at 0, π/3 and 2π/3 radians. Gas blowing needles 32A-32C are directed to impinge on the optical fiber 18 from angles of 0, π/3 and 2π/3 radians. The opening and closing of the windows 36A-36C of choppers 34A-34C as the choppers 34A-34C rotate are illustrated in FIG. 4, according to one synchronous controlled embodiment. For every 0.1 meters of the fiber, only one chopper has a window 36A-36C open for cooling gas, such as air, to blow through the corresponding window and onto the outer surface of optical fiber 18. The process alternates through each chopper 34A-34C and may be repeated indefinitely. The motor speed that drives the choppers 34A-34C can be controlled so that a desired frequency for the mode coupling occurs. The spatial frequency can be increased by implementing multiple open and closed positions within one or more choppers 34A-34C, according to other embodiments.

FIGS. 3A-3C illustrate three examples of optical choppers that may be employed by each of gas blowing devices 30A-30C. The optical chopper 34A illustrated in FIG. 3A has an open window 36A extending 180° to enable a stream of forced gas to flow through the window 36A one-half revolution or one-half of the time. The chopper 34A shown in FIG. 3B has a window 36A extending 120° so as to allow a stream of forced gas flow through the window 36A one-third of each rotation or one-third of the time. The chopper 34A shown in FIG. 3C has a complex window arrangement which includes two windows 36A that allows for mixing of different frequency components. The number of windows employed within each chopper 34A-34C is defined as a chopper multiplier. In the example shown in FIG. 2, with the chopper multiplier 3, a spatial period of the mode coupling pattern of 0.03 meters or 3 centimeters can be achieved. The capability of the motors 38A-38C and choppers 34A-34C allows for the generation of a spatial period of 1 millimeter or less, when desired. According to another example, ten (10) equiangularly spaced open windows 36A may be employed within a complete revolution of each chopper, such that the spatial frequency of the blowing pattern on the fiber 18 is multiplied by a factor of 10. In this way, a spatial frequency can be achieved that is otherwise difficult to achieve.

Figure 5:
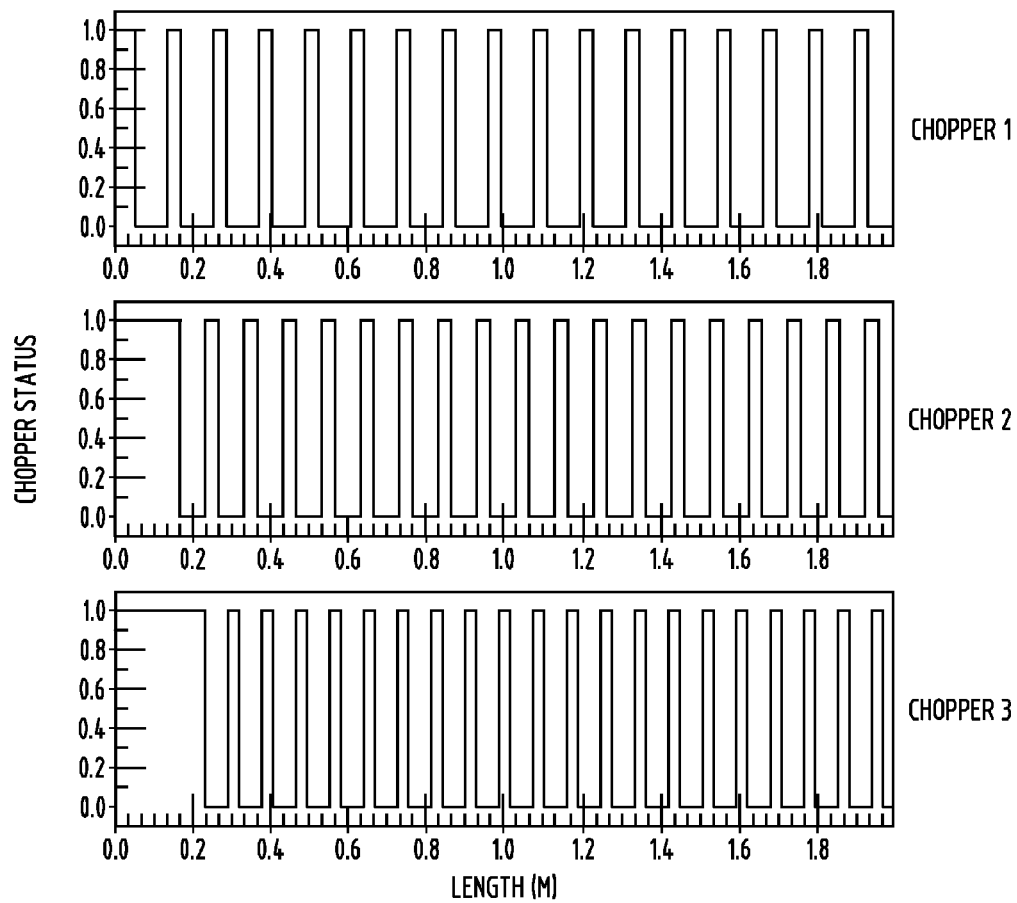
FIG. 5 is a timing diagram illustrating the chopper open/close status as a function of fiber position for an asynchronized chopper control scheme.

According to another embodiment, the method of producing an optical fiber may introduce index perturbations to the optical fiber via a plurality of perturbation sources arranged at different azimuthal locations, wherein the index perturbations are introduced by the plurality of perturbation sources at different frequencies. In this embodiment, an asynchronous index perturbation introduction scheme can be implemented by setting the drive motor frequencies to slightly different values relative to each motor so that the beating between different frequencies will allow opening of the choppers 34A-34C at different times resulting in asymmetry of the fiber stress distributed along the fiber in high frequencies. This may be achieved by the control circuitry, such as microprocessor 40, controlling the individual motor frequencies to achieve a desired rotational speed that is different from one another. In one example, at a draw speed of 10 meters per second and the same chopper position employing randomly chosen phase for each chopper, an axial displacement of 0 meters, 0.1 meters and 0.2 meters, the chopper frequency may be chosen so that the first chopper 34A is rotated at a frequency of 85 Hz, the second chopper 34B is rotated at a frequency of 100 Hz, and the third chopper 34C is rotated at a frequency of 115 Hz. The chopper status is illustrated in FIG. 5, according to this example. At any given moment of the fiber position, one or more choppers are open for cool gas to blow through the open window to the outer surface of the optical fiber 18. Because of the beating due to different motor speeds associated with each chopper, the fiber 18 at different positions sees a complex pattern mixing very different frequency components which may help generate mode coupling along the length of the multimode fiber.

While the perturbation assembly 20 is shown employing three perturbation sources 30A-30C, it should be appreciated that a greater number of index perturbation devices may be employed. According to one embodiment, the number of index perturbation devices is in the range of 3 to 20, and may be in the range of 3-6. While the spacing of the choppers is shown as equiangularly, it should be appreciated that the spacing may otherwise be uniform or non-uniform. While the axial positioning of the perturbation devices 30A-30C is shown to be at different axial locations along the length of the optical fiber 18, it should be appreciated that the perturbation devices may be employed at the same axial location or length of the fiber 18. When multiple windows are employed in choppers 34A-34C, it should be appreciated that the windows may be angularly equally spaced or non-equally spaced. In another embodiment, the motors may be modulated so that the choppers 34A-34C do not have a uniform speed, according to other embodiments. The choppers 34 could be replaced by ring motors with an open window to blow air through, according to further embodiments. It should further be appreciated that while fiber spinning is eliminated or reduced by use of the index perturbation introduction method, fiber spinning may be employed in conjunction with the method of producing the optical fiber, according to various embodiments.

Figures 6A, 6B, 6C:
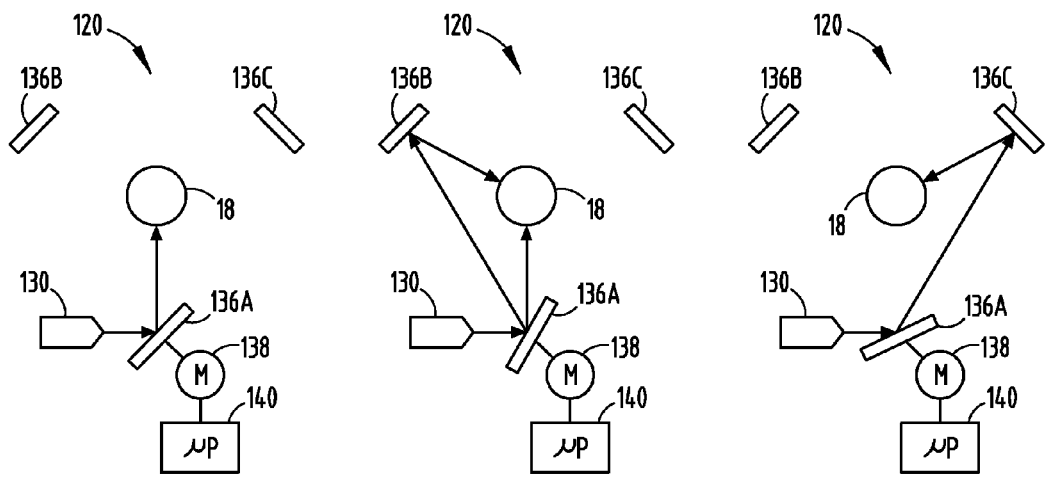
FIGS. 6A-6C illustrates an index perturbation assembly employing laser beams as the perturbation sources, according to a second embodiment.

Referring to FIGS. 6A-6C, an index perturbation assembly 120 is illustrated according to a second embodiment. In this embodiment, index perturbations are introduced via a plurality of perturbation sources which are made up of laser beams arranged at different azimuthal locations with respect to the optical fiber 18. In contrast to cooling the optical fiber which exits the furnace as described in the first embodiment by blowing cool air, this embodiment causes index perturbations by heating the optical fiber 18 at select locations to cause the index perturbations. The laser beams thereby act as heating sources to change the temperature profile of the optical fiber 18 such that stress in the fiber 18 causes index perturbations. The perturbation assembly 120 is shown employing a laser source 130 for generating a laser output and three mirrors 136A-136C for directing the laser output or beams at different azimuthal locations and onto the outer surface of the bare optical fiber 18. Mirror 130 is shown coupled to a motor 138 controlled via control circuitry, such as a microprocessor 140. The motor 138, operated via a control signal from the microprocessor 140, steers the beam steering mirror 136 to achieve a desired beam direction. As shown in FIG. 6A, the laser output generated by laser source 130 is reflected from mirror 136A at a first position or angle on a first laser beam onto fiber 18 from a first angle. Next, the mirror 130 is moved to a second position or angle to direct the laser output from the first mirror 136A onto the second mirror 136B which directs a second laser beam onto another surface of the optical fiber 18 at a different second angle, which is shown at 120° relative to the first laser beam shown in FIG. 6A. In FIG. 6C, the mirror 136A is further moved to a third position or angle to redirect the laser output onto a third mirror 136C which directs a third laser beam onto the outer surface of the fiber 18 at a different third angle shown at 240° relative to the first laser beam shown in FIG. 6A.

It should be appreciated that the laser beams may be reflected directly onto the fiber 18 or may be steered to other directions as shown and described herein. It should further be appreciated that multiple laser sources may be employed, in place of the mirror arrangement described herein. The laser beams may be controlled to provide asynchronous heating of the optical fiber or may operate at different frequencies according to the various embodiments described herein. It should further be appreciated that the laser beams may impinge upon the optical fiber at different locations along the axial length or at the same axial length. To obtain a desired temperature profile, both the laser illumination period and the orientation can be controlled by the microprocessor 140. The laser power can be varied to optimize the outcomes. The laser can be used for varying the temperature profile including, but not limited to, a $CO_2$ laser operating around 10 micrometers, a YAG laser or fiber laser operating at 1 to 2 micrometers, or other lasers operating at a wavelength close to the fiber absorption spectrum. The change in heating profile and intensity distribution, additional optics, such as beam homogenizer and/or optical lens can be used. The beam homogenizer changes the laser beam intensity distribution while the lens changes the beam size on the fiber. Both can be applied independently or combined together.

The laser heating embodiment can be achieved by two or more separate laser sources which are pulsed at the desired perturbation frequency relative to the draw speed. Pulsed lasers are known to have frequencies greater than 1 kHz frequencies with very high power, such as Q-switch lasers, and furthermore can be synchronized in operation to obtain the complex perturbation patterns. Implementation of very high frequency perturbations may minimize the requirement for moving optics.

Accordingly, the method for producing an optical fiber advantageously introduces index perturbations to the optical fiber to introduce mode coupling in the glass level, particularly for a multimode fiber. The perturbations are distributed in different orientations and from different angles such that mode coupling is more effective and bandwidth improvement occurs at a shorter length regime.

It will be apparent to those skilled in the art that various modifications and variations can be made without departing from the spirit or scope of the claims.

What is claimed is:

1. A method for producing a multimode optical fiber, said method comprising the steps of:
    drawing a bare optical fiber from a heated glass source in a furnace; and
    introducing index perturbations comprising local changes in the refractive index onto an outer surface of the bare multimode optical fiber as the bare multimode optical fiber exits the furnace via a plurality of perturbation sources arranged at different azimuthal locations with respect to the fiber, wherein the index perturbations in the outer surface are introduced by the plurality of perturbation sources at the different azimuthal locations and at different frequencies to cause stress in the multimode optical fiber, wherein the plurality of perturbation sources comprises at least a first perturbation source applying index perturbations onto the outer surface at a first frequency and a second perturbation source applying index perturbations onto the outer surface at a second frequency, wherein the index perturbations in the outer surface of the multimode optical fiber are configured to introduce mode coupling.

2. The method of claim 1 further comprising the step of coating the optical fiber following the step of introducing the index perturbations.

3. The method of claim 1, wherein the index perturbations are introduced at different locations along the axial length of the fiber.

4. The method of claim 3, wherein the perturbation sources are arranged at different locations along the axial length of the fiber.

5. The method of claim 1, wherein the step of introducing the index perturbations comprises blowing gas with a plurality of gas sources onto an outer surface of the drawn fiber.

6. The method of claim 5, wherein the step of blowing gas comprises blowing gas with the plurality of gas sources arranged with corresponding choppers which control air output from the gas sources applied to the optical fiber.

7. The method of claim 6, wherein the choppers are rotated relative to the gas sources, wherein each chopper rotates at a different speed.

8. The method of claim 1, wherein the step of introducing the index perturbations comprises heating the drawn fiber with a plurality of laser outputs.

9. The method of claim 1, wherein the plurality of perturbation sources further comprises a third perturbation source applying index perturbations at a third frequency, and wherein the step of introducing the index perturbations comprises introducing index perturbations at a plurality of locations, wherein the plurality of locations is in the range of 3 to 20 locations.

* * * * *